July 5, 1949.   W. BOLER   2,474,929
AUTOMATIC VALVE AND SWITCH FOR HYDRAULIC BRAKES
Filed May 8, 1947.

INVENTOR;
WILLIAM BOLER
BY A. E. Fisher
ATTORNEY

Patented July 5, 1949

2,474,929

UNITED STATES PATENT OFFICE 2,474,929

AUTOMATIC VALVE AND SWITCH FOR HYDRAULIC BRAKES

William Boler, St. Louis, Mo.

Application May 8, 1947, Serial No. 746,752

3 Claims. (Cl. 200—53)

This invention relates to hydraulic brakes of motor vehicles, which conventionally employ brake drums, brake shoes and brake cylinders at all four wheels of the vehicle, the said cylinders being operated for forcing out the shoes by means of hydraulic fluid forced out from a central master cylinder through connecting pipes and hose, upon the operation of the brake pedal of the vehicle.

In the use of such brake systems it sometimes happens that the rubber washers, packing or gaskets of such brake cylinders wear out or leak, thereby permitting the hydraulic fluid to drain out, not only from the particular cylinder concerned, but also from the master cylinder itself, and from the brake cylinders of the other wheels, thus incapacitating the entire braking system.

It is the purpose of the present invention, therefore, to provide means for automatically closing off the disabled cylinder and stopping the flow of hydraulic fluid thereto, to the end that this fluid may be conserved for continued use in the other brake cylinders, thus preserving to a substantial extent the efficiency of the braking system.

Another object of the invention is to provide for mounting upon the instrument board of the vehicle, a series of electrically operated pilot lamps, including one for each of the four wheels of the vehicle, the arrangement being such that on the failure of any one of the wheel brakes or the brake cylinder thereof, when the brake pedal is pressed, not only will the flow of hydraulic fluid be cut off from that cylinder, but the corresponding pilot lamp on the instrument board will light up, thus indicating to the driver the wheel concerned.

Still another object of the invention is to provide a special form of valve for incorporating in the pipe or hose lines leading from the master cylinder to the special brake or wheel cylinders of the braking system of a motor vehicle, so designed and constructed that should any one of the wheel cylinders fail to function, and there should be a consequent leakage of the hydraulic fluid from the system, the valve will automatically function for closing the flow of fluid to the disabled wheel cylinder and thus prevent further loss of the fluid.

With the stated objects in view, together with such other and additional objects and advantages as may appear from the following specification, a preferred embodiment of the invention is shown in the accompanying drawing wherein.

Figure 3:
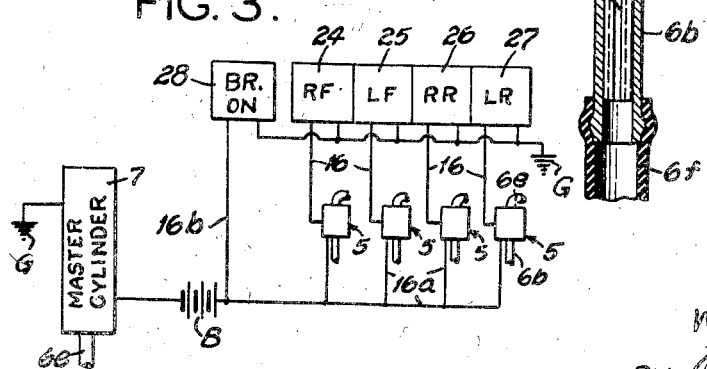
Figure 3 is a schematic lay-out of the electrical wiring system of a four wheel braking system of a motor vehicle, showing automatic valves (on a greatly reduced scale) incorporated in the system for controlling the flow of hydraulic fluid to the wheel brake cylinders, and showing in addition a panel of pilot or signal lamps as mounted upon the instrument board of the vehicle.

The essential element of this invention resides in the automatic fluid control valve, here represented generally at 5. This valve includes a cylindrical cup-shaped shell, housing or casing 6, closed at the bottom side 6a except for the centrally extended fluid outlet pipe 6b which leads to one of the wheel brake cylinders (not shown). The casing 6 is closed at its upper side by a flanged cap 6c, the pendant flange being internally threaded as shown for threaded engagement with the exteriorly threaded margin of the casing. The cap 6c is formed with the central nipple 6d for engaging the fluid inlet pipe 6e which is connected to the master cylinder 7 of the system (Figure 3). A metallic valve block 8 is mounted within the base of the casing 6, the same being formed centrally with a conical or funnel-shaped valve seat 8a which opens downwardly into the outlet pipe 6b, and being formed also with a lateral contact aperture 8b into which is inserted and firmly seated the inner end of an insulating tube 9, the latter being inserted horizontally through an aperture 6f in the side of the casing 6 and through the block 8. A metallic sleeve 10 is snugly seated through the tube 9, the inner end of this tube being reduced for freely passing the inner end of a metallic contact pin 11, the same being formed with a head 11a for abutting the complemental shoulder formed by the reduced inner end of the sleeve 10. A resilient coil spring 12 is seated within the sleeve 10 against the head 11a. An outer complemental contact pin 13 is seated in the outer end of the sleeve 10, this pin being formed with a head at its inner end for abutting the spring 12 and slightly compressing same, the pin 13 itself being held in place within the outer end of the sleeve 10 by means of a tubular gasket 14 pressed into the sleeve and up against the head of the pin 13. The pin 13 is threaded and is thus passed through the interiorly threaded gasket 14. A pair of lock-nuts 15 are mounted upon the outer threaded end of the pin 13, being thus adapted for lockingly engaging between them the terminal of an electric wire 16 in conventional manner, the opposite end of this wire being extended to and operatively connected with the pilot lamps 24, 25, 26, 27, for providing one side of the electrical circuit of the system. The inner extremity of the pin 11 is rounded off as shown, and the arrangement of the elements is such that under the urge of the spring 12, this rounded extremity of the pin 11 is protruded slightly into the valve seat 8a, for a purpose to be described.

Figure 1:
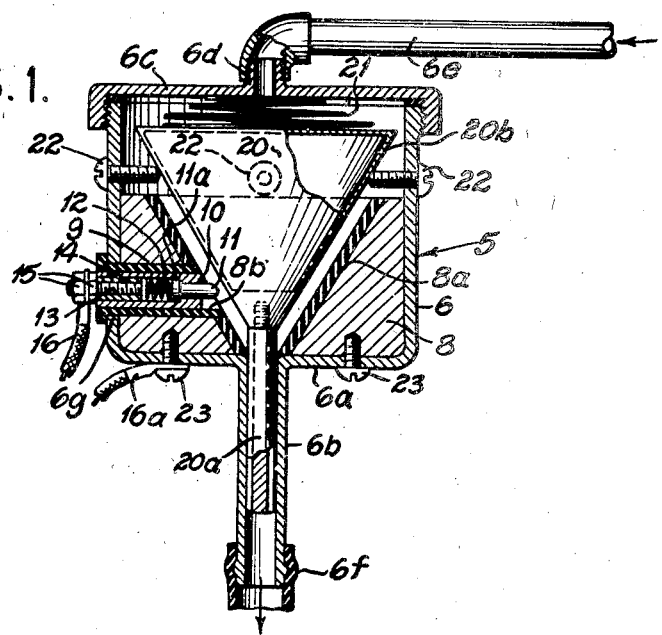
Figure 1 is a vertical section through a valve assembly as constructed in accordance with this invention, showing the valve open as for passing the hydraulic fluid from the master cylinder to an associated wheel brake cylinder.
Figure 2:
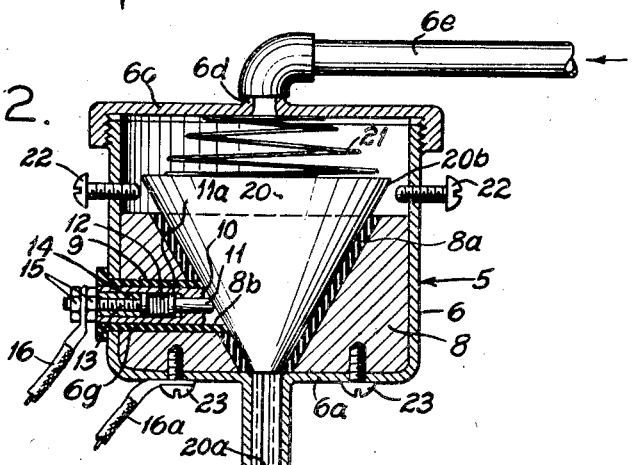
Figure 2 is a view similar to that of Figure 1, the valve however being shown as closed, for closing off the flow of the fluid to the associated wheel brake cylinder.

A hollow, metallic, conical valve float 20 is provided, the same being formed to complementally and closely fit into the valve seat 8a. This valve float is formed with a pendant guide stem 20a extended down from its pointed and closed lower end and into the outlet pipe 6b, the stem thus functioning to maintain the valve float to its operative upright position. With no hydraulic fluid in the casing 6 and with the set-screws 22 fully retracted outwardly, the valve float 20 will fall by gravity to its closed position as shown in Figure 2, and in contact with the inner end of the contact pin 11, for closing the electrical circuit through the wire 16. In such complete downward movement of the valve-float 20, it will not only contact the inner end of the pin 11, but will press that pin outwardly somewhat, against the urge of the spring 12. In order however to more firmly hold the valve float to its closed position, a rather flexible and resilient spiral spring 21 is braced under slight compression between the inner side of the cap 6c and the upper side of the valve float 20, thus guarding the valve float against displacement under the vibrations of the vehicle in which it is mounted. This spring however is not sufficiently strong to overcome the normal buoyancy of the float in the operation of the device. A number of set-screws 22 are threadedly passed through opposite walls of the casing 6, slightly below the upper side of the valve float 20, and in a common horizontal plane, and by merely turning these set-screws and projecting them inwardly against the sloping walls of the valve float, it is evident that the valve float will be raised upwardly from its closed position, as shown in Figure 2, to its open position as shown in Figure 1, in which open position any electrical current passing through the elements would be broken. In operation of the braking system and with the set-screws 22 turned up inwardly sufficiently for preventing the complete descent of the valve-float 20 into contact with inner end of the pin 11, and thus provide in addition a conical passage-way for the hydraulic fluid between the valve-block 8 and the valve-float 20, whereby with the fluid entering the casing 6 through the top thereof, it would pass down through said conical passage-way and would press circumferentially around and inwardly against the inwardly sloping walls of the valve-float 20, and this fluid being under pressure from the master cylinder 7, would force the valve-float still further upward, thus maintaining the electrical circuit in open position, in the manner referred to. The valve block 8 is releasably held in place within the casing 6 by said screws 23 passed through the bottom 6a of the casing into the block. One of these screws also serves to engage under its head the terminal of the wire 16a forming the other side of the electrical circuit, said wire being grounded as at G.

One of the automatic valve units as described is incorporated in the pipe or hose lines indicated at 6e—6f, running from the master cylinder 7 to the several wheel brake cylinders (not shown). A series of pilot lamps 24, 25, 26, 27, is mounted in panel formation on the instrument board (not shown) of the vehicle, there being a lamp for each wheel of the vehicle as indicated in Figure 3, and these lamps are connected in conventional manner through the wiring system as indicated at 16a and which includes the wiring 16b (Figure 3) extended back to the rear stop lamp (not shown), and to the brake pedal as indicated at 28 (Figure 3). The arrangement of the electrical hook-up is such that as the brake pedal 28 is pressed down to "on" position, the electrical current will be closed, not only through the rear stop lamp, but also through any such one of the four automatic valve units above described, as may happen to be disabled through leakage of fluid from the wheel brake cylinder, by virtue of the closing of the valve float 20 thereof down upon the contact pin 11, and thus closing the circuit also through the connected pilot lamp, for indicating which wheel is concerned.

The provision of the circumferentially spaced set-screws 22 provide a handy means for raising the valve float 20 from the contact pin 11, thus opening the electrical circuit for the purposes of repairing or cleaning the parts.

In the operation of the braking system as described and the shut-off valves as incorporated therein, should leakage of the hydraulic fluid occur at either of the four brake-cylinders of the wheels, the back pressure of the fluid in the connected casing 6 and around the walls of the valve-float 20, which pressure normally raises and sustains the float 20 from contact with inner end of the contact pin 11, is greatly reduced and lessened, and to the extent that when the brake-pedal 28 is pressed down, the valve-float 20 moves downward and into contact with the inner end of the contact pin 11, as shown in Figure 2, thus closing the electrical circuit through the connected pilot lamp on the instrument board for indicating the wheel affected.

It is thought that from the foregoing description the construction, use and operation of the invention will be fully understood, and while I have here shown and described a specific embodiment of the invention, the structural features thereof may be changed or modified as desired, within the scope however of the appended claims.

I claim:

1. In a device of the kind described, a special form of valve for incorporating in the pipe or hose lines leading from the master cylinder of the hydraulic brake system of a motor vehicle to one of the wheels of the vehicle provided with a hydraulically operated form of brake, the same including a metallic, conical casing closed at bottom except for a centrally extended fluid outlet pipe leading to the braking devices of the wheel, said casing being provided with a removable cap for its upper side and the cap having a nipple for engaging the fluid inlet pipe from the master cylinder a conical float valve disposed in the casing, the said casing being formed with a lateral contact pin aperture, an insulated contact pin freely mounted through said aperture of the casing and spring-set to normally urge inwardly with its inner end adapted to contact the conical float valve as it moves downward in the conical casing, means for guiding the float valve for up and down movements in the conical casing, and the hydraulic fluid within the casing sufficing to normally support the float valve from contact with the inner end of the contact pin, whereby as the fluid in the casing diminishes through leakage of the hydraulic fluid at the wheel the valve float will move down into contact with the contact pin for closing a connected electrical circuit through a signal lamp.

2. In a device of the kind described for mounting in a pipe line leading from the master cylinder of the hydraulic brake system of a wheelborne motor vehicle to the connected wheel cylinder of one of the wheels thereof, a conical casing closed at bottom except for a centrally extended fluid outlet pipe connected with the pipe line leading to the wheel cylinder, the casing being provided with a removable cap at its upper side, said cap having a nipple for engaging the fluid inlet pipe from the master cylinder, a conical valve float mounted freely within the conical casing, means for supporting the valve float from contact with the conical casing for providing a fluid passageway therebetween, an electrical contact pin passed freely and laterally through the conical casing and being spring-set to contact at its inner end the valve float when the latter is in its lowermost position within the casing and whereby an electrical circuit would be closed through an associated signal lamp, the hydraulic fluid passing through the said passageway between the float and casing sufficing to normally raise the valve float from contact with the pin, but being insufficient for this purpose when leakage occurs at the wheel brake cylinder.

3. A valve of the character described for connection in the hydraulic fluid circuit from the master cylinder of a hydraulic brake system to the brake actuating cylinder, comprising a casing having a fluid inlet at its upper end for connection to the master cylinder and a fluid connection at its lower end leading to the brake actuating cylinder, the said casing being hollow and having a conical valve seat, a conical float valve positioned in said casing and adapted as the fluid level therein decreases to descend therein and seat in said conical seat to isolate the brake actuating cylinder from the rest of the system when that cylinder leaks and thus causes the fluid level in the casing to so decrease, the said casing having a contact pin guide sleeve opening into the seat at one side, and a contact pin in said sleeve yieldably projected into the path of the float valve for engagement thereby as the valve descends for controlling a suitable signal circuit.

WILLIAM BOLER.

REFERENCES CITED

The following references are of record in the file of this patent:

UNITED STATES PATENTS

| Number | Name | Date |
|---|---|---|
| 684,893 | Whitfield | Oct. 2, 1901 |
| 1,280,222 | Hester | Oct. 1, 1918 |
| 1,659,890 | Nelson | Feb. 21, 1928 |
| 1,951,882 | Pentecost | Mar. 20, 1934 |
| 2,015,731 | Roth | Oct. 1, 1935 |
| 2,085,173 | Stansbury | June 29, 1937 |
| 2,087,386 | Norton | July 20, 1937 |
| 2,161,441 | Vickers | June 6, 1939 |
| 2,239,348 | Wirtanen | Apr. 22, 1941 |